Patented Oct. 17, 1944

2,360,537

UNITED STATES PATENT OFFICE 2,360,537

METHOD OF REMOVING MERCAPTANS FROM HYDROCARBON OIL

George W. Ayers, Chicago, and Lawrence M. Henderson, Winnetka, Ill., assignors to The Pure Oil Company, Chicago, Ill., a corporation of Ohio No Drawing. Application March 17, 1943, Serial No. 479,534

6 Claims. (Cl. 196—30)

This invention relates to the removal of weakly acidic bodies from substantially neutral water-immiscible organic liquids and is more particularly concerned with the removal of mercaptans from hydrocarbon oils such as gasoline.

In Patent 2,297,621 there is disclosed a process for the removal of weakly acidic bodies, such as mercaptans from hydrocarbon liquids, by means of aqueous solutions of caustic alkali containing alkali metal naphthenates and a solventizer therefor. The process covered by the claims of this patent is known as the Mercapsol process and the treating solution is known as the Mercapsol solution.

The effectiveness of Mercapsol solutions for removing or extracting mercaptans from hydrocarbon oil generally varies directly with the concentration of free alkali and alkali metal naphthenates in the solution. Thus, more concentrated alkali solutions containing higher concentrations of alkali metal naphthenates remove larger amounts of mercaptans from gasoline or other hydrocarbons. However, there is a practical limit to the concentration of both the free alkali and the alkali metal naphthenates in the treating solution due to the fact that as the concentrations of the two are increased the naphthenates precipitate out of solution. A further reason why the concentration of these ingredients must be limited is that at lower temperatures precipitation of naphthenates from the solution occurred. Although a solution may be satisfactory under summer operating conditions, a drop in atmospheric temperature will cause precipitation in the solution. Furthermore, as concentration of free alkali and alkali metal naphthenates increase the viscosity of the treating solution increases to a point where the solution cannot be readily handled and causes emulsion difficulties when mixed with the hydrocarbon oil to be treated.

We have discovered that the effectiveness of Mercapsol and other solutions containing solubility promoters, for extracting mercaptans from hydrocarbon oils, can be considerably enhanced by adding thereto certain glycols. The addition of the glycols contemplated by the invention does not deleteriously affect the physical characteristics of the treating solution when added in amounts which are compatible with the treating solution.

An object of this invention is to provide an improved process for extracting weakly acidic bodies from otherwise neutral water-immiscible organic liquids.

Another object of the invention is to provide an improved method for extracting mercaptans from hydrocarbon oils such as gasoline.

Still another object of the invention is to provide a method of improving the ability of Mercapsol solution to extract acidic bodies such as mercaptans from otherwise neutral water-immiscible organic liquids such as hydrocarbon oils.

A further object of the invention is to provide an improved reagent for extracting weakly acidic bodies such as mercaptans from otherwise neutral water-immiscible organic liquids such as hydrocarbon oils.

Other objects of our invention will become apparent from the following description.

In accordance with our invention we add to Mercapsol solution one or more glycols selected from the group consisting of triethylene glycol, propylene glycol and butylene glycols, including 1,3 butylene and isobutylene glycols. Solutions in accordance with our invention may be prepared by mixing together in proper proportions water, alkali metal hydroxide, such as sodium hydroxide or potassium hydroxide, naphthenic acids, solventizer such as phenol or cresol and one or more glycols from the aforesaid group. It will be apparent that the naphthenic acids and the solventizer may be added as such or may be added in the form of the alkali metal salt.

Although the proportions of the ingredients in the treating solution may vary within wide limits, in order for the solution to be effective for extracting mercaptans from hydrocarbon oil the solution should contain at least 5% by weight of free caustic alkali and not less than about 10% by weight of alkali metal naphthenates. The amount of solventizer which may be used must be at least sufficient to keep the naphthenates in solution. The amount of glycol may vary from 1% up to 20%, but in no case should be more than the amount which is compatible with the solution. We have found that an amount of free alkali i. e. alkali metal hydroxide over and above that necessary to react with ingredients in the treating solution, between 10 and 20% by weight and a concentration of from 15 to 25% of alkali metal naphthenates gives good results.

In order to demonstrate the effectiveness of adding the aforesaid glycols to Mercapsol solution, a series of solutions was prepared and tested on mercaptan-containing gasoline produced by high pressure thermal cracking on petroleum oil. The Mercapsol solution used in the tests was made by mixing together the following ingredients:

| | Per cent by weight |
|---|---|
| Sodium hydroxide | 18.3 |
| Naphthenic acids (240–260XX) | 18.6 |
| Meta-para cresol | 6.4 |
| Water | 56.7 |

The naphthenic acids used in preparing this solution correspond to those given under column 2, Table II, on page 3 of Henderson et al. Patent No. 2,297,621. The free sodium hydroxide content of the resulting solution was 12.6% by weight.

In preparing various solutions containing glycols for testing, the Mercapsol solution prepared, as set forth above, was modified by substituting a portion of the water in the Mercapsol solution by an equal portion by weight of the particular glycol.

In making tests with the various solutions 300 cc. of untreated gasoline, to which neither inhibitor nor tetraethyl lead was added, was shaken for 15 minutes in an atmosphere of nitrogen with 21 cc. of the respective treating solution. The mercaptan and disulfide sulfur was determined on the gasoline immediately before and after the treatment with the treating solution. The results from the various tests made are tabulated in the following table:

| Treating solution No. | Composition of treating solution | Percent mercaptan S in untreated gasoline | Percent mercaptan S in treated gasoline | Percent disulfide S in untreated gasoline | Percent disulfide S in treated gasoline | Percent mercaptan S removed |
|---|---|---|---|---|---|---|
| 1 | 85% by wt. H₂O, 15% by wt. NaOH | 0.0189 | 0.0095 | 0.0048 | 0.0044 | 49.7 |
| 2 | Mercapsol | 0.0189 | 0.0055 | 0.0048 | 0.0058 | 65.6 |
| 3 | Mercapsol with 14% by wt. of triethylene glycol | 0.0189 | 0.0042 | 0.0048 | 0.0037 | 77.7 |
| 4 | Mercapsol with 14% by wt. of propylene glycol | 0.0189 | 0.0035 | 0.0048 | 0.0061 | 74.6 |
| 5 | Mercapsol with 14% by wt. of ethylene glycol | 0.0189 | 0.0051 | 0.0048 | 0.0073 | 59.7 |
| 6 | Mercapsol with 14% by wt. of diethylene glycol | 0.0189 | 0.0042 | 0.0048 | 0.0077 | 62.4 |
| 7 | Mercapsol with 7% by wt. of tetraethylene glycol | 0.0189 | 0.0064 | 0.0048 | 0.0061 | 59.3 |
| 8 | Mercapsol with 7% by wt. of dipropylene glycol | 0.0189 | 0.0062 | 0.0048 | 0.0058 | 62.0 |
| 9 | Mercapsol with 7% by wt. of 2-methyl-pentanediol-2,4 | 0.0189 | 0.0044 | 0.0048 | 0.0079 | 60.3 |
| 10 | Mercapsol with 14% by wt. of glycerine | 0.0189 | 0.0064 | 0.0048 | 0.0057 | 61.3 |
| 11 | Mercapsol with 7% by wt. of sorbitol | 0.0189 | 0.0059 | 0.0048 | 0.0084 | 49.8 |
| 12 | Mercapsol with 7% by wt. of mannitol | 0.0189 | 0.0062 | 0.0048 | 0.0080 | 50.2 |
| 13 | Mercapsol with 14% by wt. of dextrose | 0.0189 | 0.0066 | 0.0048 | 0.0084 | 46.0 |
| 14 | 85% by wt. H₂O, 15% by wt. NaOH | 0.0325 | 0.0149 | 0.0011 | 0.0031 | 48.0 |
| 15 | Mercapsol | 0.0325 | 0.0093 | 0.0011 | 0.0034 | 64.0 |
| 16 | Mercapsol with 14% by wt. of triethylene glycol | 0.0325 | 0.0061 | 0.0011 | 0.0063 | 65.2 |
| 17 | Mercapsol with 14% by wt. of propylene glycol | 0.0325 | 0.0053 | 0.0011 | 0.0034 | 76.6 |
| 18 | Mercapsol with 14% by wt. of 1,3-butylene glycol | 0.0325 | 0.0054 | 0.0011 | 0.0044 | 73.2 |
| 19 | Mercapsol with 14% by wt. of isobutylene glycol | 0.0325 | 0.0052 | 0.0011 | 0.0058 | 69.5 |
| 20 | Mercapsol with 7% by wt. of hexamethylene glycol | 0.0325 | 0.0075 | 0.0011 | 0.0058 | 62.5 |
| 21 | 87.4% by wt. H₂O, 12.6% by wt. NaOH | 0.0330 | 0.0135 | 0.002 | 0.003 | 56.1 |
| 22 | Mercapsol | 0.0330 | 0.0102 | 0.002 | 0.003 | 66.1 |
| 23 | 86.0% by wt. H₂O, 14.0% by wt. of propylene glycol | 0.0330 | 0.0330 | 0.002 | 0.003 | None. |
| 24 | 71.9% by wt. H₂O, 28.1% by wt. of propylene glycol | 0.0330 | 0.0325 | 0.002 | 0.003 | None. |
| 25 | 73.4% by wt. H₂O, 12.6% by wt. NaOH, 14.0% by wt. propylene glycol | 0.0330 | 0.0142 | 0.002 | 0.003 | 53.9 |
| 26 | 59.3% by wt. H₂O, 12.6% by wt. NaOH, 28.1% by wt., propylene glycol | 0.0330 | 0.0197 | 0.002 | 0.001 | 40.3 |
| 27 | Mercapsol with 14% by wt. of propylene glycol | 0.0330 | 0.0065 | 0.002 | 0.004 | 74.3 |

From the series of treatments, Nos. 1 to 13, it will be seen that Mercapsol solution extracted considerably more mercaptan from the gasoline than did straight caustic soda solution. The results further show that the addition of triethylene glycol and propylene glycol further enhance the ability of the Mercapsol solution to extract mercaptans from the gasoline, whereas the addition of ethylene glycol, diethylene glycol, tetraethylene glycol and dipropylene glycol detracted from the ability of the Mercapsol to extract mercaptans. The same is true of other polyhydroxy alcohols such as 2-methyl-pentanediol-2,4, glycerine, sorbitol, mannitol and dextrose.

In the series of tests including Nos. 14 to 20 triethylene glycol, propylene glycol, 1,3-butylene glycol and isobutylene glycol all enhance the mercaptan extracting ability of Mercapsol, whereas hexamethylene glycol detracted from the ability of Mercapsol solution to extract mercaptans from gasoline.

The series of treatments Nos. 21 to 27 show that propylene glycol in the absence of Mercapsol detracts from the ability of caustic soda solution to extract mercaptans from gasoline. This fact serves to emphasize the unexpected result obtained by mixing propylene glycol and the other glycols covered by this invention with Mercapsol.

Although we have described our invention in connection with the enhancing of Mercapsol solution by means of the addition of certain glycols, the invention is also applicable to enhancing the mercaptan extracting ability of aqueous alkali solutions containing other solubility promotors, particularly phenolic and/or naphthenic constituents recovered as "acid oil" from spent caustic alkali solution used in the washing of petroleum oils and distillates. Acid oils "sprung" from spent caustic soda by means of neutralization with acid or acid anhydride such as carbon dioxide have the ability to act as solubility promoters to enhance the ability of caustic alkali in extracting mercaptans from gasoline and other hydrocarbon oils. The ability of these "acid oils" to enhance the mercaptan extracting ability of caustic alkali solutions is increased by the addition of glycols selected from the group consisting of propylene glycol, triethylene glycol and butylene glycols.

Similarly, used or aqueous spent caustic alkali solutions which have been regenerated and in which have been concentrated acid constituents extracted from petroleum oils can be enhanced by adding thereto one or more glycols selected from the aforementioned group.

Although we have used 7% by volume of treating solution based on the gasoline treated in the examples herein set forth, larger or smaller amount of treating solution may be used depending on the nature and amount of acidic bodies or mercaptans contained in the gasoline or other organic liquid and the completeness of extraction desired. From 5% to about 20% by volume of treating solution is sufficient for treating most types of liquids.

We claim:

1. The method of removing mercaptans from hydrocarbon oil which comprises contacting said oil with an aqueous solution containing not less than 5% by weight of free alkali metal hydroxide, not less than about 10% by weight of alkali metal naphthenate salts, a solventizer for said salts and a glycol selected from the group consisting of triethylene glycol, propylene glycol and butylene glycols, said glycol being present in amounts not less than about 1% by weight.

2. Method in accordance with claim 1 in which the glycol is triethylene glycol.

3. Method in accordance with claim 1 in which the glycol is propylene glycol.

4. Method in accordance with claim 1 in which the glycol is 1,3-butylene glycol.

5. The method of extracting mercaptans from gasoline which comprises contacting said gasoline with an aqueous solution containing from about 5% to 20% of free alkali metal hydroxide selected from the group consisting of sodium and potassium hydroxides, from about 10 to 25% of alkali metal naphthenates, a solventizer for said naphthenates, selected from the group consisting of alkali metal phenolates and cresolates in amount sufficient to keep the naphthenates in solution and from about 1 to 20% of a glycol selected from the group consisting of triethylene glycol, propylene glycol and butylene glycols.

6. The method of removing mercaptans from hydrocarbon oil comprising contacting said oil with an aqueous solution containing approximately 10–20% of free alkali metal hydroxide, an amount of alkali metal naphthenates in excess of that which is soluble in the alkali solution in the absence of a solventizer and sufficient to enhance the mercaptan extracting ability of the alkali solution, sufficient solventizer to keep the naphthenates in solution and a glycol selected from the group consisting of triethylene glycol, propylene glycol and butylene glycols, said glycol being present in amounts not less than 1% by weight.

GEORGE W. AYERS.
LAWRENCE M. HENDERSON.